United States Patent
Tobing et al.

(10) Patent No.: US 9,334,423 B2
(45) Date of Patent: May 10, 2016

(54) COMPOSITIONS COMPRISING AN ACRYLIC BLOCK COPOLYMER AND A UV-CURABLE COPOLYMER AND METHODS OF MAKING AND USING THE SAME

(71) Applicant: BASF SE, Ludwigshafen (DE)

(72) Inventors: Singa D. Tobing, Charlotte, NC (US); Hiruy Yigezu, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 25 days.

(21) Appl. No.: 14/012,377

(22) Filed: Aug. 28, 2013

(65) Prior Publication Data

US 2014/0066539 A1  Mar. 6, 2014

Related U.S. Application Data

(60) Provisional application No. 61/695,595, filed on Aug. 31, 2012, provisional application No. 61/777,291, filed on Mar. 12, 2013.

(51) Int. Cl.
| | |
|---|---|
| *C08F 2/46* | (2006.01) |
| *C08F 2/50* | (2006.01) |
| *C08G 61/04* | (2006.01) |
| *C09J 7/02* | (2006.01) |
| *C09J 153/00* | (2006.01) |

(52) U.S. Cl.
CPC .............. *C09J 7/0221* (2013.01); *C09J 153/00* (2013.01)

(58) Field of Classification Search
CPC .............................. C09J 153/00; C09J 7/0221
USPC ............. 522/46, 33, 6, 1, 71, 189, 184; 520/1
See application file for complete search history.

(56) References Cited

U.S. PATENT DOCUMENTS

| 6,723,407 B2 | 4/2004 | Dollase et al. |
|---|---|---|
| 2003/0096075 A1* | 5/2003 | Dollase et al. ............... 428/40.1 |
| 2003/0119970 A1* | 6/2003 | Husemann et al. ........... 524/505 |
| 2004/0260030 A1* | 12/2004 | Husemann et al. ........... 525/302 |
| 2006/0199029 A1* | 9/2006 | Liu ....................... C08F 220/18 428/500 |
| 2008/0269404 A1 | 10/2008 | Paul et al. |
| 2009/0272950 A1 | 11/2009 | Lu et al. |
| 2009/0305068 A1 | 12/2009 | Morishita et al. |
| 2009/0324945 A1 | 12/2009 | Duesterwald et al. |
| 2011/0217255 A1 | 9/2011 | Kim et al. |
| 2011/0257316 A1* | 10/2011 | Wuerch et al. ................ 524/271 |

FOREIGN PATENT DOCUMENTS

| EP | 1329466 | 7/2003 |
|---|---|---|
| EP | 1603984 | 8/2011 |
| WO | 2008004805 | 1/2008 |

OTHER PUBLICATIONS

Aufmuth, How can UV curable adhesives contribute to success in the tape industry, May 2012, Pressure Sensitive Tape Council Presentation.*

English-language Abstract of EP 1 603 984 from the European Patent Office website, EspaceNet.

Aufmuth, How Can UV Curable Adhesives Contribute to Success in the Tape Industry?, Pressure Sensitive Tape Council Presentation (May 2012).

Miker et al., UV-Crosslinkable Solvent-Free PSA Systems, Pressure Sensitive Tape Council Presentation (May 2012).

* cited by examiner

*Primary Examiner* — Ling Choi
*Assistant Examiner* — Jessica E Whiteley
(74) *Attorney, Agent, or Firm* — Meunier Carlin & Curfman LLC

(57) ABSTRACT

Disclosed herein are compositions comprising an acrylic block copolymer and a UV-curable copolymer, wherein the composition is capable of being crosslinked by means of ultraviolet radiation. Also disclosed herein are methods of making the compositions disclosed herein, comprising providing an acrylic block copolymer, providing a UV-curable copolymer, heating the acrylic block copolymer, heating the UV-curable copolymer, and mixing them together to form a copolymer blend. The compositions and methods disclosed can be used, for instance, in pressure-sensitive adhesive applications including, but not limited to, labels, films, or tapes.

22 Claims, No Drawings

COMPOSITIONS COMPRISING AN ACRYLIC BLOCK COPOLYMER AND A UV-CURABLE COPOLYMER AND METHODS OF MAKING AND USING THE SAME

CROSS-REFERENCE TO RELATED APPLICATIONS

This application claims priority to U.S. Provisional Patent Application No. 61/695,595 filed Aug. 31, 2012, and to U.S. Provisional Patent Application No. 61/777,291 filed Mar. 12, 2013, which are both incorporated herein by reference in their entirety.

FIELD OF THE DISCLOSURE

The present disclosure relates to compositions comprising an acrylic block copolymer and a UV-curable copolymer, wherein the composition is capable of being crosslinked by means of ultraviolet radiation, and methods of making the same. The compositions disclosed herein can be used in a variety of applications including, but not limited to, pressure-sensitive adhesive (PSA) applications.

BACKGROUND

Acrylic block copolymers can be used, for instance, in solid melt acrylic pressure-sensitive adhesive (PSA) applications without the need for ultraviolet curing. However, acrylic block copolymers do not have the high tack property required for most PSA applications. Thus, low-temperature plasticizers, tackifying resins, or combinations thereof need to be added to the acrylic block copolymers to improve tack and its processability as hot melts. Unfortunately, these additives can cause ghosting or staining, and can possibly even leave adhesive residue when used in PSA applications. UV-curable copolymers can be used, for instance, in solid-melt acrylic PSA applications. The UV-curable copolymers can be crosslinked with ultraviolet radiation, and can exhibit high tack and cohesion at room temperature. The shortcomings of the current UV-curable acrylic PSAs are difficult melt coatability due to melt stringiness and formation of angel hairs, lower high temperature shear resistance compared to solvent-based acrylic PSAs, and limited peel values for removable PSA selection. Accordingly, finding a hot-melt-based acrylic PSA with ease of coatability, high-temperature shear resistance and broad peel values for removable PSA applications are of value in the PSA industry.

SUMMARY OF THE DISCLOSURE

Disclosed herein are compositions comprising an acrylic block copolymer, a UV-curable copolymer, and a photoinitiator, wherein the composition is capable of being crosslinked by means of ultraviolet radiation.

The acrylic block copolymer can comprise the unit P(A)-P(B) composed of one polymer block P(A) and one polymer block P(B), wherein the one polymer block P(A) represents a homopolymer or copolymer block derived from monomer A, the polymer block P(A) having a measured glass transition temperature of 50° C. to 200° C., wherein the polymer block P(B) represents a homopolymer or copolymer block derived from monomer B, the polymer block P(B) having a measured glass transition temperature of −100° C. to 10° C.; and wherein the polymer blocks P(A) and P(B) are not homogenously miscible with one another. In some embodiments, the polymer block P(A) is present in the acrylic block copolymer in an amount from 5% by weight to 50% by weight, and the polymer block P(B) is present in the acrylic block copolymer in an amount of 50% by weight to 95% by weight. Monomer A can include methyl methacrylate, a vinyl aromatic, or a mixture thereof. Monomer B can include an alkyl acrylate wherein the alkyl group has from 4 to 9 carbon atoms. In some embodiments, the acrylic block copolymer has a polydispersity of from 1.0 to 1.5.

The UV-curable copolymer can be derived from a (meth) acrylate monomer, the UV-curable copolymer being capable of being crosslinked by means of ultraviolet radiation. In some embodiments, the (meth)acrylate monomer is selected from the group consisting of butyl acrylate, 2-ethylhexyl acrylate, and mixtures thereof. The photoinitiator can include acrylated benzophenone. Optionally, the UV-curable copolymer may contain functional groups that are receptive to reaction-initiated free radical or cationic photoinitiators triggered by UV radiation.

In some embodiments, the photoinitiator is bonded to a monomer unit of the UV-curable copolymer. For example, the UV-curable copolymer can include a (meth)acrylate monomer unit that has a pendant benzophenone group bonded to it. In some embodiments, in addition to or in place of the photoinitiator bonded to the UV-curable copolymer, the composition can include a photoinitiator that is not bonded to the UV-curable copolymer but that is provided separately in the composition (e.g., by post-adding the photoinitiator to the composition).

Also disclosed herein are methods of making the compositions disclosed herein, comprising melt mixing an acrylic block copolymer, a UV-curable copolymer, and a photoinitiator at a temperature sufficient to soften the UV-curable copolymer and the acrylic block copolymer to form a copolymer blend. The photoinitiator can be as described above and can be bonded to a monomer unit of the UV-curable copolymer. Alternatively or additionally, a photoinitiator can be provided that is not bonded to the UV-curable copolymer. In some embodiments, a tackifier, a crosslinker, or a combination thereof, is melt mixed with the UV-curable copolymer and the acrylic block copolymer. The method can further comprise forming a coating using the copolymer blend and curing the coating with ultraviolet radiation to produce a UV-cured coating. The compositions and methods disclosed can be used, for instance, in PSA applications including, but not limited to, labels, films, or tapes.

The details of one or more embodiments are set forth in the description below. Other features, objects, and advantages will be apparent from the description and from the claims.

DETAILED DESCRIPTION

Disclosed herein are compositions comprising an acrylic block copolymer and a UV-curable copolymer, wherein the composition is capable of being crosslinked by means of ultraviolet radiation. Also disclosed herein are methods of making the compositions disclosed herein, comprising hot melt mixing of the acrylic block copolymer and the UV-curable copolymer, where in the composition is capable of being crosslinked by means of UV radiation. The compositions and methods disclosed can be used, for instance, in pressure-sensitive adhesive applications including, but not limited to, labels, films, or tapes.

The acrylic block copolymer can comprise the unit P(A)-P(B) composed of one polymer block P(A) and one polymer block P(B), wherein the one polymer block P(A) represents a homopolymer or copolymer block derived from monomer A, the polymer block P(A) having a measured glass transition temperature of 50-200° C., wherein the polymer block P(B) represents a homopolymer or copolymer block derived from monomer B, the polymer block P(B) having a measured glass transition temperature of −100-10° C.; and wherein the polymer blocks P(A) and P(B) are not homogenously miscible with one another. The polymer blocks P(A) can also be referred to as "hard" blocks and the polymer blocks P(B) as "elastomer" blocks.

The acrylic block copolymer can include two or more blocks. For example, the acrylic block copolymer can be a diblock copolymer, a triblock copolymer, or a mixture thereof. The acrylic block copolymer comprises at least the unit P(A)-P(B). In some embodiments, the acrylic block copolymer contains at least the unit P(A)-P(B)-P(A) composed of at least one polymer block P(B) and at least two polymer blocks P(A), where P(A) independently of one another represent homopolymer or copolymer blocks of monomers A. In some embodiments, the two polymer blocks P(A) are spatially separate from one another.

The acrylic block copolymer can, for instance, be described by one of the following general formulae:

P(A)-P(B)

P(A)-P(B)-P(A)

P(B)-P(A)-P(B)-P(A)-P(B)

$[P(A)-P(B)]_nX$ $[P(B)-P(A)-P(B)]_nX$ $[P(A)-P(B)]_nX[P(B)]_m$ wherein n is greater than or equal to 2 (e.g., 2, 3, 4, 5, 6, 7, 8, 9, 10, 11, or 12), m is greater than or equal to 2 (e.g., 2, 3, 4, 5, 6, 7, 8, 9, 10, 11, or 12), and X represents a polyfunctional branching unit (i.e., a chemical building block via which different polymer arms can be linked to one another). The polyfunctional branching unit can be, for instance, a single bond (thus, when X is a covalent bond and n=2, $[P(A)-P(B)]_nX$ is P(A)-P(B)-P(A) and $[P(B)-P(A)-P(B)]_nX$ is P(B)-P(A)-P(B)-P(A)-P(B)). The acrylic block copolymers disclosed herein can be prepared and used in a wide variety of structures including, but not limited to, linear or branched chains comprising the polymer blocks P(A) and P(B), or to star-shaped block copolymers containing at least two spatially separate polymer blocks P(A).

In some embodiments, the acrylic block copolymer comprises the symmetrical unit P(A)-P(B)-P(A), wherein the polymer blocks P(A) have identical chain length or identical chemical structure. In some embodiments, the acrylic block copolymer comprises the asymmetrical unit P(A)-P(B)-P(A), wherein the polymer blocks P(A) do not have identical chain length or identical chemical structure. In some embodiments, the acrylic block copolymer comprises the symmetrical unit P(A)-P(B)-P(A), wherein the polymer blocks P(B) have identical chain length or identical chemical structure. In some embodiments, the acrylic block copolymer comprises the asymmetrical unit P(A)-P(B)-P(A), wherein the polymer blocks P(B) do not have identical chain length or identical chemical structure.

The polymer block P(A) can comprise polymer chains of a single monomer A, or copolymers of monomers A of different structures. In some embodiments, the monomers A vary in their chemical structure and/or in the length of the alkyl radical. In some embodiments, the polymer blocks P(A) are completely homogeneous polymers, via polymers composed of monomers of identical chemical parent structure but differing in chain length, and those with the same number of carbons but different isomerism. In some embodiments, the polymer blocks P(A) comprise randomly polymerized blocks composed of monomers A of different length with different isomerism.

The monomer(s) used in polymer block P(A) produce(s) a polymer block that is immiscible with polymer block P(B), resulting in microphase separation. The monomer A can include, for instance, one or more monomers selected from a methyl methacrylate, a vinyl aromatic (e.g. styrene), cyclohexyl methacrylate, isobornyl methacrylate, acrylonitrile, or mixtures thereof, to produce a polymer block P(A) having a measured glass transition temperature of 50-200° C. Exemplary vinyl aromatics include, but are not limited to, styrene, α-methylstyrene, and p-methylstyrene, vinyl toluene, and mixtures thereof. In some embodiments, the monomer A includes a monomer that has a corresponding homopolymer having a measured $T_g$ of 100° C. or greater such as styrene, methyl methacrylate, or a mixture thereof.

The polymer block P(A) can also include other monomers such as other (meth)acrylate monomers. As used herein, the term "(meth)acrylate" includes acrylate, methacrylate, diacrylate, and dimethacrylate. In some embodiments, the (meth)acrylate can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary additional (meth)acrylates that can be used in the polymer block P(A) include, but are not limited to, methyl acrylate, ethyl (meth)acrylate, butyl (meth)acrylate, isobutyl (meth)acrylate, n-hexyl (meth)acrylate, 2-ethylhexyl (meth)acrylate, n-heptyl (meth)acrylate, ethylpentyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate and mixtures thereof. In some embodiments, the polymer block P(A) can include any amount of monomers B sufficient to reduce the glass transition temperature of the polymer block P(A).

The polymer block P(B) can comprise polymer chains of a single monomer B, or copolymers of monomers B of different structures. In some embodiments, the monomers B vary in their chemical structure and/or in the length of the alkyl radical. In some embodiments, the polymer blocks P(B) are completely homogeneous polymers, via polymers composed of monomers of identical chemical parent structure but differing in chain length, and those with the same number of carbons but different isomerism. In some embodiments, the polymer blocks P(B) are randomly polymerized blocks composed of monomers B of different length with different isomerism.

The monomer(s) used in polymer block P(B) produce(s) a polymer block that is immiscible with polymer block P(A), resulting in microphase separation. The monomer B can include, for instance, one or more monomers selected from a (meth)acrylate having from 4 to 9 carbon atoms in the alkyl chain, a vinyl monomer, a macromonomer, or mixtures thereof, that produce a polymer block P(B) having a measured glass transition temperature of −20° C. or less. Exemplary (meth)acrylates for monomer B can include n-butyl (meth)acrylate, n-pentyl (meth)acrylate, n-hexyl (meth)acrylate, n-heptyl (meth)acrylate, n-octyl (meth)acrylate, n-nonyl (meth)acrylate; branched isomers thereof, such as 2-ethylhexyl acrylate and isooctyl acrylate; and cyclic monomers such as cyclohexyl acrylate, norbornyl acrylate, and isonorbornyl acrylate.

Vinyl monomers for monomer B can include vinyl esters, vinyl ethers, vinyl halides, vinylidene halides, and also vinyl compounds that comprise aromatic cycles and heterocycles. Exemplary vinyl monomers include, but are not limited to, vinyl acetate, vinylformamide, vinylpyridine, ethyl vinyl ether, 2-ethylhexyl vinyl ether, butyl vinyl ether, vinyl chloride, vinylidene chloride, acrylonitrile, and mixtures thereof.

Exemplary macromonomers for monomer B include, but are not limited to, polymers comprising a monomer B and carrying a polymerizable unit in at least one position (e.g., at the chain end). Exemplary polymerizable units include, but are not limited to, a methacrylic, acrylic or vinyl group. In some embodiments, the macromonomer includes a polydiene. Monomer B can also include, for instance, N-methylolacrylamide, (meth)acrylic acid, allyl alcohol, maleic anhydride, itaconic anhydride, itaconic acid, benzoin acrylate, acrylated benzophenone, acrylamide, glycidyl methacrylate, and mixtures thereof. In some embodiments, a macromonomer is used to incorporate polymer side chains into the acrylic block copolymer. In some embodiments, the monomer B includes a monomer that has a corresponding homopolymer having a Tg of −20° C. or less such as butyl acrylate, 2-ethylhexyl acrylate, or a mixture thereof.

The polymer block P(B) can also include other monomers such as other meth(acrylate) monomers. In some embodiments, the (meth)acrylate can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary additional (meth)acrylates that can be used in the polymer block P(B) include, but are not limited to, methyl (meth)acrylate, ethyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth) acrylate, 2-ethylhexyl (meth)acrylate, 2-propylheptyl (meth) acrylate, 2-phenoxyethyl (meth)acrylate, isobornyl (meth) acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth) acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth) acrylate and mixtures thereof. In some embodiments, the polymer block P(B) can include any amount of monomers A sufficient to increase the glass transition temperature of the polymer block P(B).

In some embodiments, a graft process is used to incorporate side chains into the acrylic block copolymer. In some embodiments, one or more of the polymer blocks contains one or more grafted-on side chains. Systems of this kind can be obtained both by a graft-from process (polymerizational attachment of a side chain starting from an existing polymer backbone) and by a graft-to process (attachment of polymer chains to a polymer backbone by means of polymer-analogous reactions). In some embodiments, side chain block copolymers of this type are prepared by using, as monomers B, monomers functionalized in such a way as to allow a graft-from process for the grafting on of side chains. For instance, (meth)acrylic monomers carrying halogen functionalization or functionalization provided by any other functional groups that permit, for example, an ATRP (atom transfer radical polymerization) process, can be used herein. Alternatively, the polymer backbone may be prepared using macrocomonomers (i.e., polymer chains functionalized with a polymerizable unit).

In some embodiments, the polymer blocks P(B) have had incorporated into them one or more functional groups that permit radiation-chemical crosslinking of the polymer blocks, for instance, by means of ultraviolet radiation or irradiation with rapid electrons. Monomer units that can be used to permit crosslinking include, but are not limited to, acrylic esters containing an unsaturated alkyl radical having from 3 to 18 carbon atoms and at least one carbon-carbon double bond. Exemplary monomers permitting crosslinking include, but are not limited to, acrylates modified with double bonds (e.g., allyl acrylate and acrylated cinnamates) and vinyl compounds containing double bonds that are not reactive during the (radical) polymerization of the polymer block P(B). Exemplary comonomers permitting crosslinking include, but are not limited to, isoprene, butadiene, chloroprene, and mixtures thereof. In some embodiments, polymer blocks P(A) and/or P(B) are functionalized in a way that permits thermally initiated crosslinking. Exemplary crosslinkers include, but are not limited to, epoxides, aziridines, isocyanates, polycarbodiimides, metal chelates, and mixtures thereof.

The acrylic block copolymer, polymer block P(A), and polymer block P(B) can have both a theoretical glass-transition temperature ($T_g$) and a measured $T_g$. The theoretical $T_g$ is calculated using the Fox Equation. The measured $T_g$ is measured using the midpoint temperature using differential scanning calorimetry (DSC) as described, e.g., in ASTM 3418/82. In some embodiments, the polymer block P(A) has a measured $T_g$ of 50° C. or greater (e.g., 60° C. or greater, 70° C. or greater, 80° C. or greater, 90° C. or greater, 100° C. or greater, 110° C. or greater, 120° C. or greater, 130° C. or greater, 140° C. or greater, 150° C. or greater, 160° C. or greater, or 170° C. or greater). In some embodiments, the polymer block P(A) has a measured Tg of 200° C. or less (e.g., 190° C. or less, 170° C. or less, 150° C. or less, 130° C. or less, 110° C. or less, 90° C. or less, or 70° C. or less). In some embodiments, the polymer block P(A) has a measured $T_g$ of from 50° C. to 200° C. (e.g., from 60° C. to 190° C., from 70° C. to 180° C., from 80° C. to 170° C., from 90° C. to 160° C., from 100° C. to 150° C., or from 110° C. to 140° C.). In some embodiments, the polymer block P(B) has a measured $T_g$ of 20° C. or less (e.g., 10° C. or less, 0° C. or less, −10° C. or less, −20° C. or less, −30° C. or less, −40° C. or less, −50° C. or less, −60° C. or less, −70° C. or less, −80° C. or less, or −90° C. or less). In some embodiments, the polymer block P(B) has a measured Tg of −100° C. or greater (e.g., −90° C. or greater, −80° C. or greater, −70° C. or greater, −60° C. or greater, −50° C. or greater, −40° C. or greater, −30° C. or greater, −20° C. or greater, −10° C. or greater, or 0° C. or greater). In some embodiments, the polymer block P(B) has a measured $T_g$ of from −100° C. to 20° C. (e.g., from −90° C. to 0° C., from −80° C. to −10° C., from −70° C. to −20° C., or from −60° C. to −30° C.). Unless otherwise specified, the $T_g$ as mentioned herein refers to the measured $T_g$. The differences between soft blocks and hard blocks can provide a functional polymer that can be formulated into a PSA having, for instance, a good balance of adhesive and cohesive properties.

In some embodiments, the polymer block P(A) is derived from 10% to 50% (e.g., from 15% to 45%, from 20% to 40%, or from 25% to 35%) monomers A and 50-90% (e.g., from 55% to 85%, from 60% to 80%, or from 65% to 75%) of monomers B, by weight of polymer block P(A). In some embodiments, polymer block P(B) is derived from 60% to 100% (e.g., from 65% to 95%, from 70% to 90%, or from 75% to 85%) of the alkyl (meth)acrylate discussed above for monomer B, 0% to 25% (e.g., 5% to 20%, 10% to 15%) of vinyl monomer, and 0% to 40% of another monomer, by weight of polymer block P(B).

The relative amounts of polymer block P(A) in the acrylic block copolymer and polymer block P(B) in the acrylic block copolymer can vary. In some embodiments, the polymer block P(A) is present in the acrylic block copolymer in an amount from 5% to 50% (e.g., from 10% to 45%, from 15% to 40%, or from 20% to 35%), by weight of the total copolymer. In some embodiments, the polymer block P(B) is present in the acrylic block copolymer in an amount of 50% to 95% (e.g., from 55% to 90%, from 60% to 85%, from 65% to 80%, from 70% to 75%) by weight of the total copolymer.

The weight average molecular weight (Mw) of the acrylic block copolymer can be in the range of from 50,000 Daltons to 300,000 Daltons (e.g., from 60,000 Daltons to 250,000 Daltons, 65,000 Daltons to 285,000 Daltons, from 70,000 Daltons to 200,000 Daltons, from 80,000 Daltons to 270,000 Daltons, from 95,000 Daltons to 255,000 Daltons, from 105,000 Daltons to 240,000 Daltons, from 120,000 Daltons to 225,000 Daltons, from 135,000 Daltons to 210,000 Daltons, from 150,000 Daltons to 195,000 Daltons, or from 165,000 Daltons to 180,000 Daltons). In some embodiments, the weight average molecular weight (Mw) of the acrylic block copolymer is 50,000 Daltons or greater (e.g., 60,000 Daltons or greater, 75,000 Daltons or greater, 90,000 Daltons or greater, 105,000 Daltons or greater, 120,000 Daltons or greater, 135,000 Daltons or greater, 150,000 Daltons or greater, 165,000 Daltons or greater, 180,000 Daltons or greater, 195,000 Daltons or greater, 210,000 Daltons or greater, 225,000 Daltons or greater, 240,000 Daltons or greater, 255,000 Daltons or greater, 270,000 Daltons or greater, or 285,000 Daltons or greater). In some embodiments, the weight average molecular weight (Mw) of the acrylic block copolymer is 300,000 Daltons or less (e.g., 285,000 Daltons or less, 270,000 Daltons or less, 255,000 Daltons or less, 240,000 Daltons or less, 225,000 Daltons or less, 210,000 Daltons or less, 135,000 Daltons or less, 120,000 Daltons or less, 105,000 Daltons or less, 90,000 Daltons or less, 75,000 Daltons or less, or 60,000 Daltons or less). In some embodiments, two acrylic block copolymers are mixed, wherein one acrylic block copolymer has a weight average molecular weight of from 50,000 Daltons to 100,000 Daltons and the other acrylic block copolymer has a weight average molecular weight of from 100,000 Daltons to 300,000 Daltons.

The acrylic block polymer has a polydispersity (i.e., molecular weight distribution) defined as the weight average molecular weight (Mw) divided by the number average molecular weight (Mn). In some embodiments, the acrylic block copolymer has a polydispersity (i.e., Mw/Mn) from 1.0 to 1.5 (e.g., from 1.05 to 1.45, from 1.0 to 1.4, from 1.1 to 1.4, from 1.15 to 1.35, or from 1.2 to 1.3). In some embodiments, the acrylic block copolymer has a polydispersity of 1.0 or greater (e.g., 1.05 or greater, 1.1 or greater, 1.15 or greater, 1.2 or greater, 1.25 or greater, 1.3 or greater, 1.35 or greater, 1.4 or greater, or 1.45 or greater). In some embodiments, the acrylic block copolymer has a polydispersity of 1.5 or less (e.g., 1.45 or less, 1.4 or less, 1.35 or less, 1.3 or less, 1.25 or less, 1.2 or less, 1.15 or less, 1.1 or less, or 1.05 or less). In some embodiments, the polydispersity is chosen to achieve increased cohesion and increased durability of pressure-sensitive adhesives at high temperatures. In some embodiments, the polydispersity is chosen such that the influence of low-molecular weight components is negligible. In some embodiments, the polydispersity is chosen to prevent lower cohesion or adhesive transfer in when the label or tape is removed from a substrate. The weight average molecular weight (Mw), number average molecular weight (Mn), and thus the polydispersity (Mw/Mn) of the acrylic block copolymers described herein can be measured by gel permeation chromatography.

Processes for producing the acrylic block copolymers disclosed herein can be by any suitable process known in the art. For instance, living polymerization of monomers is adopted to obtain block copolymers having a narrow molecular weight distribution. Exemplary techniques of living polymerization include, but are not limited to, polymerization using an organic rare earth metal complex as a polymerization initiator; anionic polymerization in the presence of a mineral acid salt such as alkali metal or alkaline earth metal salt using an organic alkali metal compound as a polymerization initiator; anionic polymerization in the presence of an organoaluminum compound, an organic alkali metal compound, or combinations thereof as polymerization initiators; and atom transfer radical polymerization (ATRP).

In some embodiments, the acrylic block copolymer is a pressure-sensitive adhesive. Exemplary commercially available acrylic block copolymers include, but are not limited to, those produced by Kuraray Co. such as KURARITY® LA 2140e, KURARITY® LA 1114 (diblock), KURARITY® LA 2330, KURARITY® LA 2250, and KURARITY® LA 4285.

Also disclosed herein is a UV-curable copolymer. The UV-curable copolymer can be derived from a (meth)acrylate monomer. In some embodiments, the photoinitiator is bonded to a monomer unit of the UV-curable copolymer, wherein the UV-curable copolymer is capable of being crosslinked by means of ultraviolet radiation. In some embodiments, the UV-curable copolymer incorporates a photoinitiator (e.g., acrylated benzophenone) into the polymer backbone. Exemplary free radical photoinitiators that can be incorporated into the backbone of the UV-curable copolymer include, but are not limited to, 4-acryloxyloxy benzophenone, 4-acryloxyethoxy benzophenone, 4-acryloxybutoxy benzophenone, and 4-acryloxyhexoxy benzophenone. The UV-curable copolymers can also include functional groups that are receptive to free-radical initiation or cationic initiation, including, but not limited to, vinyl, epoxide, allyl, or oxazoline groups.

In some embodiments, the (meth)acrylate can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary (meth)acrylates, but are not limited to, methyl (meth)acrylate, ethyl (meth)acrylate, butyl (meth)acrylate, isobutyl (meth)acrylate, n-hexyl (meth)acrylate, 2-ethylhexyl (meth)acrylate, n-heptyl (meth)acrylate, ethyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate and mixtures thereof.

In some embodiments, the UV-curable copolymer is a pressure-sensitive adhesive. Exemplary commercially available UV-curable copolymers include, but are not limited to, ACRESIN® A 204 UV, ACRESIN® A 250 UV, ACRESIN® A 260 UV, AND ACRESIN® DS 3532 UV, manufactured by BASF. The UV-curable copolymer can be made by any suitable method known in the art.

In some embodiments, the composition can include a photoinitiator that is not bonded to the UV-curable copolymer (e.g., that is post-added to the composition). The post-added photoinitiator can be a free-radical photoinitiator or a cationic photoinitiator, for instance. In some embodiments, where free radical or cationic photoinitiators are used, the UV-curable copolymers can include functional groups that are receptive to free-radical initiation or cationic initiation, including, but not limited to, vinyl, epoxide, allyl, or oxazoline groups.

Exemplary post-added photoinitiators can include, but are not limited to, benzoin ethers, such as benzoin methyl ether and benzoin isopropyl ether, substituted acetophenones, such as 2,2-diethoxyacetophenone (available as IRGACURE® 651 from BASF), 2,2-dimethoxy-2-phenyl-1-phenylethanone, dimethoxyhydroxy-acetophenone, substituted alpha-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime. The above-mentioned photoinitiators and others that can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexaarylbisimidazole, triazine or fluorenone, it being possible for each of these radicals to be further substituted by one or more halogen atoms and/or one or more alkyloxy groups and/or one or more amino groups or hydroxyl groups. Both free radical and cationic photoinitiators can be used depending on the functional group of the polymer or the crosslinker. Exemplary commercially available free-radical photoinitiators include, but are not limited to, IRGACURE® 2959, IRGACURE® 184, and DAROCURE® 1173. Exemplary commercially available cationic photoinitiators include, but are not limited to, iodonium salt and hexafluoro antimony such as IRGACURE® 250.

Also disclosed herein are methods of making copolymer blends. The methods of making acrylic copolymer blends can include melt mixing of the acrylic block copolymer disclosed herein, the UV-curable copolymer disclosed herein, and the photoinitiator disclosed herein, and optionally a tackifying resin (i.e., tackifier), a crosslinker, or mixtures thereof. The acrylic block copolymer, the UV-curable copolymer, and the photoinitiator are melt mixed at a temperature sufficient to soften the acrylic block copolymer and the UV-curable copolymer. As noted herein, the photoinitiator can be bonded to the UV-curable copolymer. For example, the copolymer blend can be prepared by providing the acrylic block copolymer disclosed herein; providing the UV-curable copolymer disclosed herein; heating the acrylic block copolymer to a temperature to produce a softened acrylic block copolymer; heating the UV-curable copolymer to a temperature to produce a softened UV-curable copolymer; and melt mixing the heated acrylic block copolymer and the heated UV-curable copolymer together (optionally, along with a tackifying resin, a crosslinker, a post-added photoinitiator, or mixtures thereof) to form the copolymer blend. In some embodiments, wherein the photoinitiator is post-added, the melt mixing temperature is a temperature sufficient to melt the photoinitiator. For example, in some embodiments, the melt mixing temperature is at least 50° C. higher than the melting point of the photoinitiator. Other methods of making the copolymer blend can include mixing the acrylic block copolymer, the UV-curable copolymer, the photoinitiator, and optionally a tackifying resin, a crosslinker, or a mixture thereof, with a solvent without the need for heating.

The acrylic block copolymer can be combined with the UV-curable copolymer to form a polymer mixture. In some embodiments, the acrylic block copolymer and/or the UV-curable copolymer can be provided in the form of aqueous polymer dispersions and can include surfactants, protective colloids, and the like, as would be understood by those of skill in the art. The solids content can range from, for example, 50% to 70%.

Coatings can be made from the copolymer blends disclosed herein. In some embodiments, the acrylic block copolymer is combined with one or more additives, and then combined with the UV-curable copolymer, to form a coating composition. In some embodiments, the UV-curable copolymer is combined with one or more additives, and then combined with the acrylic block copolymer, to form a coating composition. In some embodiments, the acrylic block copolymer, the UV-curable copolymer, and one or more additives are combined to form a coating composition. In some embodiments, one or more additives is added to polymer block A, polymer block B, or both to form an acrylic block copolymer that is then combined with the UV-curable copolymer to form a coating composition. Exemplary additives include, but are not limited to, thickeners, wetting aids, defoamers, tackifiers, crosslinkers (e.g., metal salts, silane coupling agents such as glycidoxyalkyl alkoxylsilanes, or multifunctional acrylates such as trimethylolpropane triacrylate (TMPTA) or hexanediol diacrylate (HDDA)), fillers (e.g., calcium carbonate, fibers, carbon black, zinc oxide, titanium dioxide, chalk, solid or hollow glass beads, microbeads of other materials, silica, silicates), low-temperature plasticizers, nucleators, expandants, flow additives, fluorescent additives, polyolefins, rheology modifiers, surfactants, leveling additives, compounding agents and/or aging inhibitors in the form of primary and secondary antioxidants or in the form of light stabilizers, photoinitiators, pigments, dyes, or mixtures thereof. The coating can be applied to a surface and dried to produce a pressure-sensitive adhesive coating. The pressure sensitive adhesives disclosed herein can be produce strippable (temporary) or permanent adhesive bonds.

Exemplary tackifiers (tackifying resins) include, but are not limited to, natural resins, such as rosins and their derivatives formed by disproportionation or isomerization, polymerization, dimerization and/or hydrogenation. Tackifiers can include rosin and rosin derivatives (rosin esters, including rosin derivatives stabilized by, for example, disproportionation or hydrogenation) polyterpene resins, terpene-phenolic resins, alkylphenol resins, and aliphatic, aromatic and aliphatic-aromatic hydrocarbon resins, and combinations thereof. In some embodiments, the tackifying resins can be present in salt form (with, for example, monovalent or polyvalent counterions (cations)) or in esterified form. Alcohols used for the esterification can be monohydric or polyhydric. Exemplary alcohols include, but are not limited to, methanol, ethanediol, diethylene glycol, triethylene glycol, 1,2,3-propanethiol, and pentaerythritol.

Exemplary hydrocarbon tackifying resins include, but are not limited to, coumarone-indene resins, polyterpene resins, and hydrocarbon resins based on saturated CH compounds such as butadiene, pentene, methylbutene, isoprene, piperylene, divinylmethane, pentadiene, cyclopentene, cyclopentadiene, cyclohexadiene, styrene, α-methylstyrene, and vinyltoluene.

In some embodiments, the tackifying resins are derived from natural rosins. In some embodiments, the tackifying resin is selected from any resin that does not interfere with UV-curing (for instance, a resin that does not absorb so much UV radiation that it would prevent the PSA from curing satisfactorily). In some embodiments, the tackifying resins are chemically modified rosins. In some embodiments, the tackifying resins are fully hydrogenated. In some embodiments, the rosins comprise abietic acid or abietic acid derivatives. Exemplary commercially available tackifiers include, but are not limited to, FORAL® AX-E, FORAL® 85, and REGALRITE® 9100 by Eastman Chemical Company.

Exemplary crosslinkers include, but are not limited to, metal chelates, polyfunctional isocyanates, polyfunctional amines, polyfunctional alcohols, polyfunctional acrylates, and silane coupling agents such as glycidoxyalkyl alkoxysilanes. A commercially available includes, but is not limited to, LAROMER® TMPTA (trimethylol propane triacrylate) by BASF.

In some embodiments, the copolymer blend and the UV-cured coating comprising the copolymer blend comprises 15 parts to 50 parts (e.g., 20 parts to 45 parts, 25 parts to 40 parts, or 30 parts to 35 parts) of the acrylic block copolymer, from 15 parts to 30 parts (e.g., 18 parts to 28 parts, from 21 parts to 25 parts) tackifier, and 40 parts to 75 parts (e.g., 45 parts to 70 parts, from 50 parts to 65 parts, from 55 parts to 60 parts) UV-curable copolymer, by weight of the UV-cured coating. A post-added photoinitiator, if used, can be provided in an amount of from 1 part to 10 parts of the copolymer blend or UV-cured coating. A crosslinker, if used, can be provided in an amount of from 0.1 parts to 5 parts of the copolymer blend or UV-cured coating.

In some embodiments, the method further comprises forming a coating using the copolymer blend. For example, the coating can be formed onto a heated draw down table at a temperature from 125° C. to 180° C. (e.g., from 130° C. to 175° C., from 135° C. to 170° C., from 140° C. to 165° C., from 145° C. to 160° C., or from 150° C. to 155° C.). In some embodiments, the method further comprises curing the coating by ultraviolet radiation to produce a UV-cured coating. The UV-cured coating can be a pressure-sensitive adhesive, for example.

The pressure sensitive adhesives disclosed herein can be crosslinked using UV radiation. In some embodiments, the UV range is in the UV-C range from 250-290 nm (e.g., from 255-285 nm, from 260-280 nm, or from 265-275 nm). In some embodiments, the radiation dosage is from 2-100 mJ/cm$^2$ (e.g., from 10-75 mJ/cm$^2$ or from 15-40 mJ/cm$^2$), depending on the thickness of the PSA coating and the PSA properties desired.

The coatings made from the coating composition can be used in a variety of applications, such as adhesive applications (e.g., as pressure-sensitive adhesives or flooring adhesives), and for labels, films and tapes. The pressure-sensitive adhesive can be applied directly or indirectly (by the transfer method) to a substrate by means of common coating techniques including, but not limited to, slot die coating, roll coating, knife coating, or spreading. In some embodiments, the coating is applied to the substrate in a thickness of 10 microns or greater (e.g., 20 microns or greater, 30 microns or greater, 40 microns or greater, 50 microns or greater, 60 microns or greater, 70 microns or greater, 80 microns or greater, 90 microns or greater, 100 microns or greater, 110 microns or greater, 120 microns or greater). In some embodiments, the coating is applied to the substrate in a thickness of 125 microns or less (e.g., 120 microns or less, 110 microns or less, 100 microns or less, 90 microns or less, 80 microns or less, 70 microns or less, 60 microns or less, 50 microns or less, 40 microns or less). In some embodiments, the coating is applied to the substrate in a thickness of from 10 microns to 200 microns (e.g., from 15 microns to 150 microns, from 20 microns to 125 microns, from 25 microns to 100 microns, from 50 microns to 75 microns).

Exemplary substrates include, but are not limited to, paper or polymer films such as those comprising polyethylene, polypropylene, polyethylene terephthalate, polyvinyl chloride, polystyrene, polyamide, or metal. Before or after the adhesive has been applied, the substrates can be cut to form tapes, labels, or films. For example, the coating composition can be used as an adhesive for paper labels, polarizing films, protective films, solar films, double-sided tapes, and wire harness tapes. For later use, the coated side of the substrates can be lined with a release paper (e.g., siliconized paper) or a release film. In some embodiments, the pressure sensitive adhesive can be coated onto a release paper or film and then laminated onto a paper or film substrate. In some embodiments, the pressure sensitive adhesive can be used to adhere two surfaces by removing the release paper or film and adhering the paper or film substrate to a surface (such as a metal or glass surface) to produce an adhesive bond. In some embodiments, the surface bonded to the paper or film substrate can also contain a pressure sensitive adhesive. When the paper or film substrate is separated from the bonded surface, the adhesive bond can, in some embodiments, fail cohesively or adhesively. For example, in some embodiments, where the adhesive bond is intended to be permanent, the bond can fail cohesively. In some embodiments, including, but not limited to, embodiments wherein the adhesive bond is intended to be temporary, the adhesive bond can fail adhesively such that no or substantially no residue of the pressure sensitive adhesive is left on the surface. For example, the paper or film substrate can be removed from the bonded substrate at a peel force of from about 0.5 lb/in to about 2 lb/in (or even up to 2.2 lb/in) without leaving a residue of the adhesive or at least without leaving a substantial amount (less than 10%) of the adhesive residue on the surface.

Properties of the pressure-sensitive adhesives disclosed herein can be measured as described in PSTC 15$^{th}$ Test Method Manual.

Shear strength is a measure of cohesion. To test this, a substrate was coated with the adhesive and bonded to a stainless steel plate with a bonded area of 1 inch×1 inch. A 1 kg weight was hung from the substrate inside an 80° C. oven. The time required for the weight to fall from the plate was recorded.

180 degree angle peel strength is a measure of adhesion. Peel strength can be measured at different contact time intervals. In some embodiments, the peel strength is measured after 15 minutes, after 24 hours, or after 7 days at 23° C. and 50% RH. For some PSA applications, the PSA is aged on a release liner or on a stainless steel panel at high humidity and temperature (38° C., 90% RH). For some applications, the PSA adhesive coated on the substrate must be able to be removed cleanly without leaving any residue on the stainless steel panel.

Loop tack measures the coating formulation's tack, or the instantaneous force of attraction between the surface of the adhesive and the substrate at 23° C. at 50% RH. The higher the loop tack measurement, the greater the tack of the material.

By way of non-limiting illustration, examples of certain embodiments of the present disclosure are given below.

EXAMPLES

UV-curable adhesive blend compositions were prepared by melt mixing the components in a quart size metal can that was enclosed by an electric heating mantle. A propeller stirring blade was used to mix various components. Once the mixture was uniform, it was placed in a heated oven at about 150° C. while waiting for the draw down table to be heated to a temperature of about 150° C. Once the draw down table had reached the desired temperature, a 1.5 mm polyethylene terephthalate (PET) film was placed on the table under vacuum, and the molten adhesive blend composition was coated onto the PET film by knife coating. The coating was checked for coat weight accuracy before being irradiated with UV-C light with a measured dose by a Power Puck. The UV-C crosslinked adhesive was then tested for loop tack using PSTC-16, 180 degree peel using PSTC-101, and cohesion strength or shear at 80° C. using PSTC-107. Each procedure is described in the Pressure Sensitive Tape Council (PSTC) 15$^{th}$ Edition Test Method Manual.

Example 1

30 parts of KURARITY® LA 2140e was heated in a metal can gradually to 180° C. Once it started to melt, it was gently agitated using propeller mixer. Then, 20 parts of FORAL® 85 tackifying resin was added under agitation for 10-15 minutes. Once it appeared uniform, then ACRESIN® A 204 UV was added and mixed for another 20 minutes. The molten resin was coated onto a 1.5 mil PET film with target coat weight of 20 g/m$^2$. The molten PSA did not show any stringiness or angel hairs during the coating. The coated adhesive was exposed to 15 mJ/cm$^2$ UV-C radiation. The loop tack off stainless steel was 1.72 lb/in$^2$. The 15 minute dwell peel off stainless steel was 2 lb/in and the adhesive was removed without leaving any residue on the panel, which shows the adhesive is highly crosslinked. The 80° C. shear tested using a 1 kg weight and a 1×1 inch bonded area was 41 minutes. As a comparison, the same PSA coating without the exposure to UV-C radiation was tested and had a 15 minute dwell peel off stainless steel of 4.8 lb/in and left residue on the panel.

Example 2

30 parts of KURARITY® LA 2330 was heated gradually to 180° C. Once it started to melt, it was gently agitated using a propeller mixer. Then, 50 parts of ACRESIN® A 204 UV was added. When the mixture looked uniform, 20 parts FORAL® AX-E was added. Once the mixture looked uniform, it was cooled down to 115° C. Then, 5 parts BASF LAROMER® TMPTA was added and mixed for 10 minutes. Finally, 1 part of IRGACURE® 2959 was added and mixed for 10 minutes. A hot melt coating of the adhesive blend was made as in Example 1. The 20 g/m$^2$ PSA coating on the 1.5 mil PET film was irradiated by UV-C light at 40 mJ/cm$^2$. The loop tack from stainless steel was 1.9 lb/in$^2$. The 15 minute dwell peel from stainless steel was 2 lb/in. The 80° C. shear using a 1 kg weight and 1×1 inch bonded area was 36 minutes. The molten PSA did not show any stringiness or angel hairs during coating. The melt viscosity was measured by Brookfield Thermosel spindle #27, at 1 rpm, 165° C. After 1 hour at this temperature, the viscosity was 44,000 cps. After 3 hours at this temperature, the viscosity was 49,870 cps. The composition showed excellent resistance to viscosity increase when heated over time.

Example 3

The same composition and mix procedure was used as in Example 2, except that 2 parts of IRGACURE® 2959 was used. The loop tack was 2 lb/in$^2$. The 15 minute peel was 2.5 lb/in and The 80° C. shear using a 1 kg weight and a 1×1 inch bonded area was 26 minutes. The molten PSA did not show any stringiness or angel hairs during the coating.

Example 4

In this example, the mix procedure was modified compared to Example 3. 30 parts of KURARITY® LA 2330 was heated in a metal can until it reached 180° C. Then, once it melted, slow agitation with propeller blade was applied for 15 minutes. Then, 20 parts of FORAL® AX-E was added under slow agitation until uniform. The mixture was cooled to 150° C. Then, 50 parts ACRESIN® A 204 UV was added under agitation for 15 minutes. Then, 2 parts of IRGACURE® 2959 was added at this temperature and mixed for 5 minutes. Finally, the mixture was cooled down to 110° C. Once it reached 110° C., 7 parts LAROMER TMPTA was added. Mixing was continued for another 10 minutes. The 20 g/m$^2$ PSA coating on 1.5 mil PET was irradiated by UV-C light at 40 mJ/cm$^2$. The molten PSA did not show any stringiness or angel hairs during the coating. The measured loop tack off stainless steel was 2.1 lb/in$^2$. The 15 minute dwell peel off stainless steel was 1.4 lb/in. The 80° C. shear using a 1 kg weight and 1×1 inch bonded area was much greater than 72 hours. The shear value was very high compared to Example 3. An additional cohesion test was run, called a Shear Adhesion Failure Temperature (SAFT), using the method described in ASTM D4498-07. The cohesion using the SAFT method was measured by applying a 1 inch×1 inch bonded area of the coated PET film to a stainless steel panel and hanging a 1 kg load from the PET coated film in an oven. The oven temperature was increased at 1° F. per minute rate starting at 72° F. The coated adhesive fell off the panel at 295° F., which is an excellent result.

This example shows that the mixing procedure to ensure proper dispersion of IRGACURE® 2959 improved the crosslinking using LAROMER® TMPTA.

A comparison of the data from the first four examples is provided in Table 1 below.

TABLE 1

| Example | Loop Tack (lb/in$^2$) | 180 Degree Angle Peel; 15 min dwell (lb/in) | 80° C. Shear, 1 × 1 in., 1 kg | SAFT (° F.), 1 × 1 in., 1 kg, 1° F. per min. heating rate |
|---|---|---|---|---|
| Ex. 1 | 1.7 | 2 | 41 min | Not measured |
| Ex. 2 | 1.9 | 2 | 36 min | Not measured |
| Ex. 3 | 2 | 2.5 | 26 min | Not measured |
| Ex. 4 | 2.1 | 1.4 | >72 hours | 295° F. |

Example 5

A challenge in the PSA industry is to make a PSA tape or label that has reasonably high peel strength (e.g., 2 lb/in) but that can still be cleanly removable from many surfaces such as glass or metal after aging, including aging at high humidity and temperature conditions. Most PSAs that have this level of peel strength will leave a residue when removed from the substrate after aging.

20 parts of KURARITY® LA 2330 was heated in a metal container to 180° C. Once it melted, slow agitation using a propeller mixer was used while adding 80 parts of ACRESIN® A 204. Mixing was continued for another 15 minutes. Then, the PSA was coated onto a paper release liner with a target coat weight of 20 g/m$^2$. The PSA coating was irradiated with 15 mJ/cm$^2$ UV-C radiation. The adhesive on the PSA release liner was then laminated onto 1.5 mil PET film. The release liner was removed leaving the adhesive on the PET film. The 15 minute dwell peel off stainless steel was 2.2 lb/in. The 24 hour dwell peel was 2.0 lb/in and the 7 day dwell peel was 2.5 lb/in.

The PSA on the 1.5 mil PET film was also applied to a stainless steel panel and aged in a high temperature and humidity chamber (38° C., 90% RH) for 7 days. The panel was then removed from the chamber and stored overnight at 23° C., 50% RH. Peel adhesion was then tested. The peel value was 2.6 lb/in.

The 1.5 mil PET film/PSA/release liner laminate was also aged in a high heat and humidity chamber (38° C., 90% RH) for 7 days. The laminate was then aged overnight at 23° C., 50% RH. The PSA was tested for 15 minute dwell peel off stainless steel and the peel value was 2.3 lb/in.

It is noted that, in the peel tests conducted with this example, removal of the adhesive occurred with no ghosting or residue.

Comparative Example 6

ACRESIN® A 204 UV can give about 2 lb/in peel off stainless steel and ACRESIN® DS 3532 UV can give about 0.5 lb/in peel off stainless steel when tested after 15 minute dwell from stainless steel at 23° C., 50% RH.

80 parts of ACRESIN® A 204 UV was mixed with 20 parts of ACRESIN® DS3532 UV under heat and slow agitation at about 130° C. for 15 minutes. The mixture was then coated onto a paper release liner at a target coat weight of about 20 g/m$^2$ and irradiated with 15 mJ/cm$^2$ UV-C radiation. Then, the PSA was laminated onto a 1.5 mil PET film. The PSA laminate was subjected to the same aging condition and testing as in Example 5. 15 minute dwell peel from stainless steel was 1.0 lb/in. The 24 hour dwell peel was 1.3 lb/in and the 7 day dwell peel was 1.6 lb/in, but showed residue.

The adhesive on the 1.5 mil PET was applied to a stainless steel panel and aged for 7 days at 38° C., 90% RH. The panel was then removed from the chamber and stored overnight at 23° C., 50% RH. The peel was then tested and was 2 lb/in, but it had significant residue.

The 1.5 mil PET/PSA/release liner laminate was aged for 7 days at 38° C., 90% RH and the peel was 0.95 lb/in. Following this, the laminate was aged overnight at 23° C., 50% RH. The PSA was then tested for 15 minute dwell peel off stainless steel and the peel value was 1.0 lb/in with no residue.

Comparative Example 7

The same preparation and mixing procedure was used as in Example 6, except 50 parts of ACRESIN® A 204 UV was mixed with 50 parts of ACRESIN® 3532 UV and then, 10 parts FORAL® AX-E was added. The 15 min dwell peel from stainless steel was 1 lb/in. The 24 hour dwell peel was 0.7 lb/in and the 7 day dwell peel was 1.0 lb/in, but showed residue.

The adhesive on the 1.5 mil PET was applied to a stainless steel panel and aged for 7 days at 38° C., 90% RH. The panel was then removed from the chamber and stored overnight at 23° C., 50% RH. The peel was then tested and was 1.6 lb/in, but it showed slight residue.

The 1.5 mil PET/PSA/release liner laminate was aged for 7 days at 38° C., 90% RH and the peel was 0.95 lb/in. Following this, the laminate was aged overnight at 23° C., 50% RH. The PSA was then tested for 15 minute dwell peel off stainless steel and the peel value was 0.8 lb/in with no residue.

Comparative Example 8

The same preparation and mixing procedure was used as in Example 6, except 50 parts of ACRESIN® A 204 UV was mixed with 50 parts of ACRESIN® DS 3532 UV. The 15 minute dwell peel from stainless steel was 0.7 lb/in, the 24 hour dwell peel was 0.6 lb/in, the 7 day dwell peel was 0.4 lb/in, and the PSA showed no residue.

The adhesive on the 1.5 mil PET was applied to a stainless steel panel and aged for 7 days at 38° C., 90% RH. The panel was then removed from the chamber and stored overnight at 23° C., 50% RH. The peel was then tested and was 0.6 lb/in, and it showed no residue.

The 1.5 mil PET/PSA/release liner laminate was aged for 7 days at 38° C., 90% RH and the peel was 0.95 lb/in. Following this, the laminate was aged overnight at 23° C., 50% RH. The PSA was then tested for 15 minute dwell peel off stainless steel and the peel value was 0.4 lb/in with no residue.

In comparing Example 5 to Comparative Examples 6-8, it is shown that high peel value PSAs can be prepared using the compositions disclosed herein. This is significant because the adhesive can be removed cleanly after aging at high temperature and high humidity such as 38° C. and 90% RH for 7 days. Data for these examples is shown in Table 2.

TABLE 2

| Example | 15 min dwell peel at 23° C., 50% RH (lb/in) | 24 hr dwell peel at 23° C., 50% RH (lb/in) | 7 day dwell peel at 23° C., 50% RH (lb/in) | 15 min dwell peel after 7 days aging on liner at 38° C., 90% RH (lb/in) | Peel after 7 days aging on panel at 38° C., 90% RH (lb/in) |
|---|---|---|---|---|---|
| Ex. 5 | 2.2 | 2 | 2.5 | 2.3 | 2.6 |
| Comp. Ex. 6 | 1.0 | 1.3 | 1.6 (10% residue) | 1.0 | 2.0 (50% residue) |
| Comp. Ex. 7 | 1 | 0.7 | 1 | 0.8 | 1.6 (slight residue) |
| Comp. Ex. 8 | 0.7 | 0.6 | 0.4 | 0.4 | 0.6 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A composition comprising:
    an acrylic block copolymer comprising a polymer block P(A) and a polymer block P(B), wherein the polymer block P(A) represents a homopolymer or copolymer block derived from monomer A, the polymer block P(A) having a measured glass transition temperature of 50° C. to 200° C.; wherein the polymer block P(B) represents a homopolymer or copolymer block derived from monomer B, the polymer block P(B) having a measured glass transition temperature of −100° C. to 10° C.; and wherein the polymer blocks P(A) and P(B) are not homogenously miscible with one another; and
    a UV-curable, non-block copolymer derived from a (meth) acrylate monomer, the UV-curable copolymer comprising a photoinitiator bonded to a monomer unit of the UV-curable, non-block copolymer, said UV-curable, non-block copolymer being capable of being crosslinked by means of ultraviolet radiation.

2. The composition according to claim 1, wherein a (meth) acrylate monomer unit in the UV-curable, non-block copolymer has a pendant benzophenone group bonded to it.

3. The composition according to claim 1, wherein the acrylic block copolymer includes a diblock copolymer.

4. The composition according to claim 1, wherein the acrylic block copolymer includes a triblock copolymer.

5. The composition according to claim 1, wherein the acrylic block copolymer comprises the unit P(A)-P(B)-P(A).

6. The composition according to claim 1, wherein the monomer A includes methyl methacrylate, a vinyl aromatic, or a mixture thereof.

7. The composition according to claim 1, wherein the monomer A includes styrene.

8. The composition according to claim 1, wherein the monomer B includes an alkyl (meth)acrylate wherein the alkyl group has 4 to 9 carbon atoms.

9. The composition according to claim 8, wherein the monomer B includes from 60% by weight to 100% by weight of the alkyl (meth)acrylate.

10. The composition according to claim 8, wherein the monomer B includes butyl acrylate, 2 ethyl hexyl acrylate, or mixtures thereof.

11. The composition according to claim 1, wherein the monomer B includes a vinyl monomer.

12. The composition according to claim 1, wherein the monomer B includes from 0% by weight to 25% by weight of vinyl monomer.

13. The composition according to claim 1, wherein the monomer B includes an acrylic monomer having a functional group that is susceptible to undergo crosslinking by UV initiation of the photoinitiator.

14. The composition according to claim 1, wherein the polymer block P(A) is present in the acrylic block copolymer in an amount of from 5% by weight to 50% by weight, and the polymer block P(B) is present in the acrylic block copolymer in an amount of from 50% by weight to 95% by weight.

15. The composition according to claim 1, wherein the (meth)acrylate monomer in the UV-curable, non-block copolymer includes a (meth)acrylate monomer selected from the group consisting of butyl acrylate, 2 ethylhexyl acrylate, and mixtures thereof.

16. The composition according to claim 1, wherein the acrylic block copolymer includes a diblock copolymer and a triblock copolymer.

17. A pressure-sensitive adhesive, comprising the composition of claim 1.

18. A label, film, or tape comprising the pressure-sensitive adhesive of claim 17, wherein after adherence the adhesive can be removed without leaving a residue on a stainless steel panel at a peel force of from 0.5 lb/in to 2 lb/in.

19. A method of making a copolymer blend, comprising:
providing an acrylic block copolymer comprising a polymer block P(A) and a polymer block P(B), wherein the polymer block P(A) represents a homopolymer or copolymer block derived from monomer A, the polymer block P(A) having a measured glass transition temperature of 50° C. to 200° C., wherein the polymer block P(B) represents a homopolymer or copolymer block derived from monomer B, the polymer block P(B) having a measured glass transition temperature of −100° C. to 10° C., and wherein the polymer blocks P(A) and P(B) are not homogenously miscible with one another;
providing a UV-curable, non-block copolymer derived from a (meth)acrylate monomer, wherein the UV-curable copolymer comprising a photoinitiator bonded to a monomer unit of the UV-curable, non-block copolymer, said UV curable, non-block copolymer is capable of being crosslinked by means of ultraviolet radiation; and
melt mixing the UV-curable, non-block copolymer and the acrylic block copolymer at a temperature sufficient to soften the UV-curable, non-block copolymer and the acrylic block copolymer to produce a copolymer blend.

20. The composition according to claim 1, wherein the composition comprises 15 to 50 parts by weight of the acrylic block copolymer, 15 to 30 parts by weight of a tackifier, and 40 to 75 parts by weight of the UV-curable, non-block copolymer.

21. The composition according to claim 1, wherein the UV-curable, non-block copolymer includes a photoinitiator incorporated in the polymer backbone selected from 4-acryloxyloxy benzophenone, 4-acryloxyethoxy benzophenone, 4-acryloxybutoxy benzophenone, and 4-acryloxyhexoxy benzophenone.

22. The method of claim 19, wherein melt mixing the UV-curable, non-block copolymer and the acrylic block copolymer comprises:
heating the acrylic block copolymer at a temperature sufficient to soften the acrylic block copolymer;
agitating the softened acrylic block copolymer; and
adding the UV-curable, non-block copolymer to the agitated, softened acrylic block copolymer, thereby producing a copolymer blend.

* * * * *